(No Model.)

H. H. TEETER.
FILTER.

No. 329,505. Patented Nov. 3, 1885.

WITNESSES:
E. B. Bolton
Geo. Bainxon

INVENTOR:
Horace H. Teeter.
By his Attorneys,
Burke, Fraser Hounied

United States Patent Office.

HORACE H. TEETER, OF CARBONDALE, ILLINOIS.

FILTER.

SPECIFICATION forming part of Letters Patent No. 329,505, dated November 3, 1885

Application filed September 15, 1884. Serial No. 143,132. (No model.)

*To all whom it may concern:*

Be it known that I, HORACE H. TEETER, a citizen of the United States, and a resident of Carbondale, Jackson county, Illinois, have invented certain Improvements in Filters for Liquids, of which the following is a specification.

My invention is designed as a filter for all liquids, but especially for decoctions—such as coffee, for example.

Heretofore filters have been constructed of two conical tubes arranged to telescope, and a cloth stretched over the open end of one tube and clamped between them, and a band or hoop has also been employed to clamp the filtering fabric to a conical filter. These constructions I do not claim. The essential characteristic of my filter is an exterior clamping hoop, band, or ring drawn over the cloth, which covers the open end of a conical tube and extends up its sides, said hoop, band, or ring serving to clamp the cloth to the tubular filter and to support the latter in the vessel. Thus the weight of the filter and its contents tends to draw up the band or ring toward the larger part of the tube and to clamp the cloth the tighter.

Figure 1:
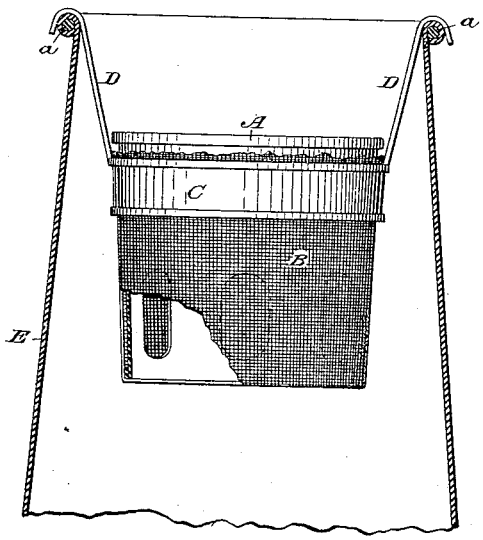
Figure 2:
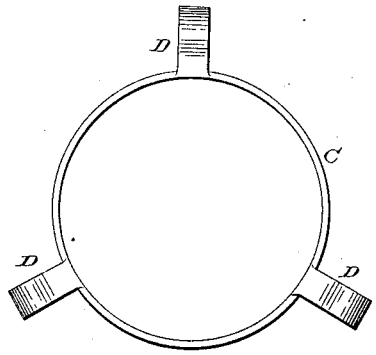
Figure 3:
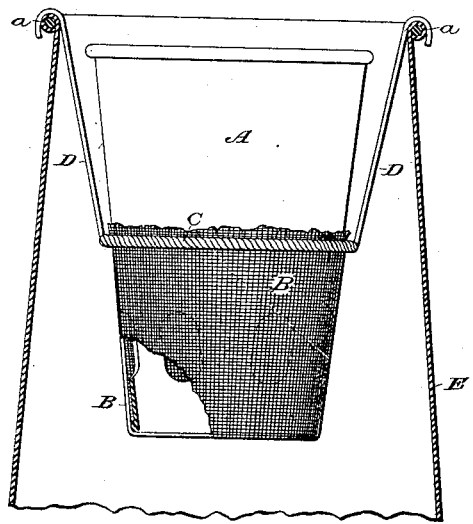

In the drawings which serve to illustrate my invention, Figure 1 shows my filter in its preferred form, the filter being in side elevation, and the vessel in which it is suspended, which may be a coffee-pot, in section. Fig. 2 is a plan of the clamping-band and its hooks detached. Fig. 3 shows a slightly-modified form of the filter, showing a twisted-wire ring in lieu of a band for sustaining the filter and securing the cloth. The exterior vessel is in section, as in Fig. 1.

Referring to Figs. 1 and 2, A represents a conical filter-tube, which may be bottomless or have large apertures in its bottom. I also prefer to provide it with large apertures in its sides, as shown; but this is not new with me.

B represents the filtering-cloth, which is drawn over the open bottom or end of the filter-tube A.

C is a band which slips over the smaller end of the filter and clamps the cloth B to the body of the filter. This band is provided with two or more suspending-hooks, D D, which take over the bead or rim *a* at the mouth of the exterior vessel, E. If but two hooks D are employed, the filter will be a swinging filter, which is desirable in some cases; but more than two hooks may be employed. I have shown three in Fig. 2. I may make the ring C by twisting together several wires—say as many as I desire to have hooks D—and employ the ends of these wires to form said hooks, as shown in Fig. 3. The ring and hooks are then tinned to prevent them from rusting. I prefer, however, to employ a flat sheet-metal band, as in Figs. 1 and 2.

In the construction described the weight of the filter and its contents tends to force the filter tube and cloth down into the band or ring, and cause the latter to clamp the tighter, and the hooks D form a very convenient support for the filter in the receiving-vessel.

In applying the cloth and ring the former is spread over the ring or band and the smaller end of the filter-tube forced down through the ring, as will be readily understood.

Having thus described my invention, I claim—

In a filter, the combination of a receiving-vessel, a filter-tube having a filter-cloth stretched around its lower part, and a clamping and supporting band or ring provided with upwardly-extended suspending-hooks adapted to catch over the upper edge of the receiving-vessel, substantially as herein specified.

In witness whereof I have hereunto signed my name in the presence of two subscribing witnesses.

HORACE H. TEETER.

Witnesses:
JOSEPH E. TROUGHTON,
WILLIAM J. ALLEN.